United States Patent Office 3,460,046
Patented Aug. 5, 1969

3,460,046
LASERS AND OPTICAL RESONATORS WITH BEAM TWISTING
Jacques A. Arnaud, Matawan Township, N.J., assignor to Bell Telephone Laboratories, Incorporated, Murray Hill, Berkeley Heights, N.J., a corporation of New York
Filed May 13, 1968, Ser. No. 728,416
Int. Cl. H01s 3/00; H03f 3/60; H04b 9/00
U.S. Cl. 330—4.3     8 Claims

ABSTRACT OF THE DISCLOSURE

Optical resonators and regenerative laser amplifiers are disclosed. In all cases, the resonators are made fully degenerate, in order to be useful in processing multiple modes or amplifying images. Full degeneracy is accomplished with relatively few lenses by inverting any bundle of resonated rays at planar reflectors. The resonators typically employ one or more rooftop reflectors or corner reflectors arranged to provide ray inversion.

Background of the invention

This invention relates to lasers and other optical devices employing optical resonators.

My investigations have been particularly concerned with regenerative laser amplifiers and passive resonators having sufficient degeneracy to be useful for image amplification, image processing, amplification of highly distorted optical communication signal wavefronts and processing of such distorted signal wavefronts. In all such cases, many, perhaps thousands of, transverse optical modes must be amplified or processed in substantially equivalent manners. Transverse modes are optical field patterns which differ in that they have different characteristic spatial variations with respect to radial displacement from a common propagation direction or axis. These optical field patterns change in size and curvature but not in shape along the propagation axis.

It has been recognized that degenerate optical resonators are useful in processing a multiplicity of transverse modes. From a geometrical point of view, an optical resonator is degenerate when an arbitrary ray retraces its own path after a single round trip. When the foregoing is true, then, within the approximation of the scalar Fresnel diffraction theory, any field configuration reproduces itself after a round trip except for an additional phase shift, which is equal to zero at the resonance frequency. An example of a heretofore unappreciated degenerate resonator is the so-called "Maxwell fish-eye," a sphere of dielectric material having an index of refraction varying approximately radially and known before for its perfect imaging properties.

Configurations heretofore proposed a degenerate optical resonators typically employ one or more lenses disposed in an otherwise substantially conventional linear resonator or ring resonator. In a linear resonator the light makes two passes in opposite directions in close proximity to a geometrical axis while making one round trip within the resonator; in a ring resonator it makes only a single pass along a polygonal geometrical axis during any single round trip in the resonator.

My theoretical analysis shows that it should be possible to reduce the number of focusing elements in degenerate optical resonators composed of discrete elements. Moreover, simplification of this sort should facilitate the use of degenerate optical resonators with lasers in image amplification and in reception of distorted wavefronts such as would occur in optical communication.

Summary of the invention

According to my invention, simplified degenerate optical resonators are provided by arrangements of planar reflectors that produce a twist or rotation of the beam resonated therein by inverting any bundle of resonated rays. In some embodiments of my invention, an appropriate inversion is provided by one or more rooftop reflectors, one or more corner reflectors, or more generally, four planar mirrors forming a non-planar ring, in combination with a smaller number of discrete focusing elements than heretofore required in fully degenerate resonators.

Brief description of the drawing

Further features and advantages of my invention will become apparent from the following detailed description, taken together with the drawing, in which.

Description of illustrative embodiments

Figure 1:
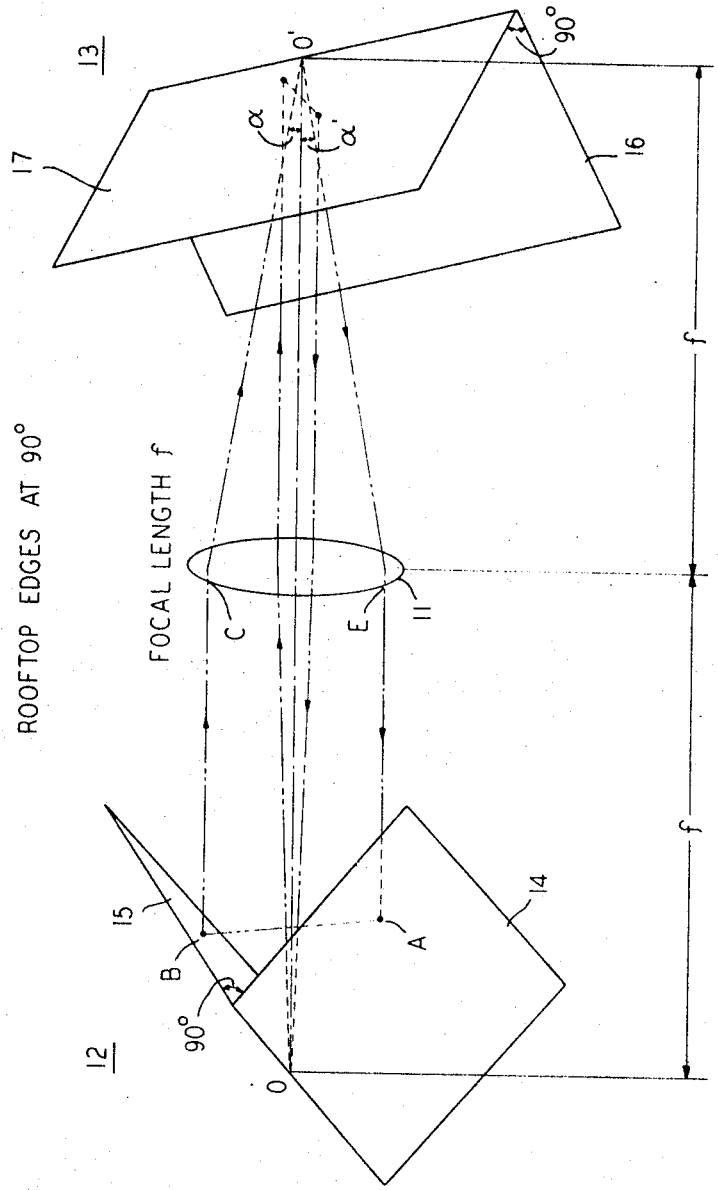
FIG. 1 is a pictorial illustration of one embodiment of a degenerate optical resonator according to my invention.

In the illustrative embodiment of FIG. 1, which is shown as a passive resonator for simplicity but could also include a laser active medium near the central lens 11, a degenerate optical resonator is formed by 90° rooftop reflectors 12 and 13, in combination with lens 11, which is disposed with one focal point on the rooftop edge of reflector 12 and another focal point on the rooftop edge of reflector 13. Thus, reflectors 12 and 13 are separated by 2f, where f is the focal length of lens 11.

In order to provide the desired ray inversion for beams resonated in the resonator of FIG. 1, the rooftop edges of reflectors 12 and 13 make an angle of 90°. Two lines which do not cross are said to make an angle $\theta$ when one of them has to be rotated by an angle $\theta$ to render it parallel to the other one.

Assume that leaf 14 and leaf 15 of reflector 12 are partially transmissive so that a beam or ray of light may enter. The special properties of the proposed resonator is that the image inversion (half turn) which results from the use of two confocal converging lenses (as it is well known in telescopes using two confocal converging lenses) is cancelled by a half turn provided by the flat mirrors. These mirrors, i.e., the leaves of reflectors 12 and 13, have the effective of erecting the image reversed by the lenses (as do the prisms used in the so-called König erecting prism used in binoculars for instance, so that the image can be brought into coincidence with the object, the magnification being unity because the two confocal lenses are chosen with equal focal lengths). Accordingly, in the embodiment of FIG. 1, the self consistency condition is satisfied for any transverse optical wave pattern.

The embodiment of this general principle will be better understood by considering FIGURE 1. Let us first recall to general results. A 90° rooftop reflects a ray incident in the plane perpendicular to its roof top edge in a direction parallel to the incident direction with the opposite sense. If the ray is incident in a plane oblique to respect to that plane, the usual laws of reflection on a single plane apply insofar as the ray has a component parallel to the rooftop edge. In other words, to predict this portion of the effect, we can image a reflecting plane through the rooftop edge and making equal angles with respect to the leaves. The resultant ray output direction is a vector sum of both of the foregoing effects.

Let us also recall that when a ray is incident on a lens parallel to the optical axis, it is deflected in such a way that it crosses the lens optical axis at the focal point (a point at a distance from the lens equal to the so-called focal length of the lens).

With these two remarks in mind, the ray paths shown in FIGURE 1 can be understood. The rooftop 12 (leaves 14 and 15) is shown for clarity with the edge nearly perpendicular to the paper and the rooftop 13 with the edge nearly in the plane of the paper. Let us consider a special ray BC parallel to the optical axis OO' (the latter being perpendicular to both rooftop edges). Because BC is parallel to the optical axis, it is deflected by the lens to focus O'. Because the ray is in a plane parallel to the edge of 13 we may apply the usual law of reflection on a plane so that $\alpha = \alpha'$ in the plane of incidence. If the ray were directed so that it also had a component not in a plane parallel to the edge, still, in its projection on that plane, $\alpha = \alpha'$.

Next, because O' is the focus of the lens, EA is parallel to the optical axis. And because we are now in a plane orthogonal to the rooftop edge of rooftop 12 the ray comes back in line with BC, according to the first principle set out above. What has been shown for one ray can be shown for the symmetrical ray, which is the ray shown incident at O in FIG. 1; and general calculations show that a sufficient condition for degeneracy is that any two rays which do not cross the optical axis at the same point, retrace their own path after a round trip. The ray just traced and its symmetrical ray do not cross the axis OO' at the same points. Consequently, we have proved that the cavity of FIGURE 1 is degenerate.

It should be noted that the resonator of FIG. 1 is simpler than prior art degenerate resonators in that it has only one focusing element. The prior art resonators typically have three focusing elements (including two focusing end reflectors).

Figure 2:
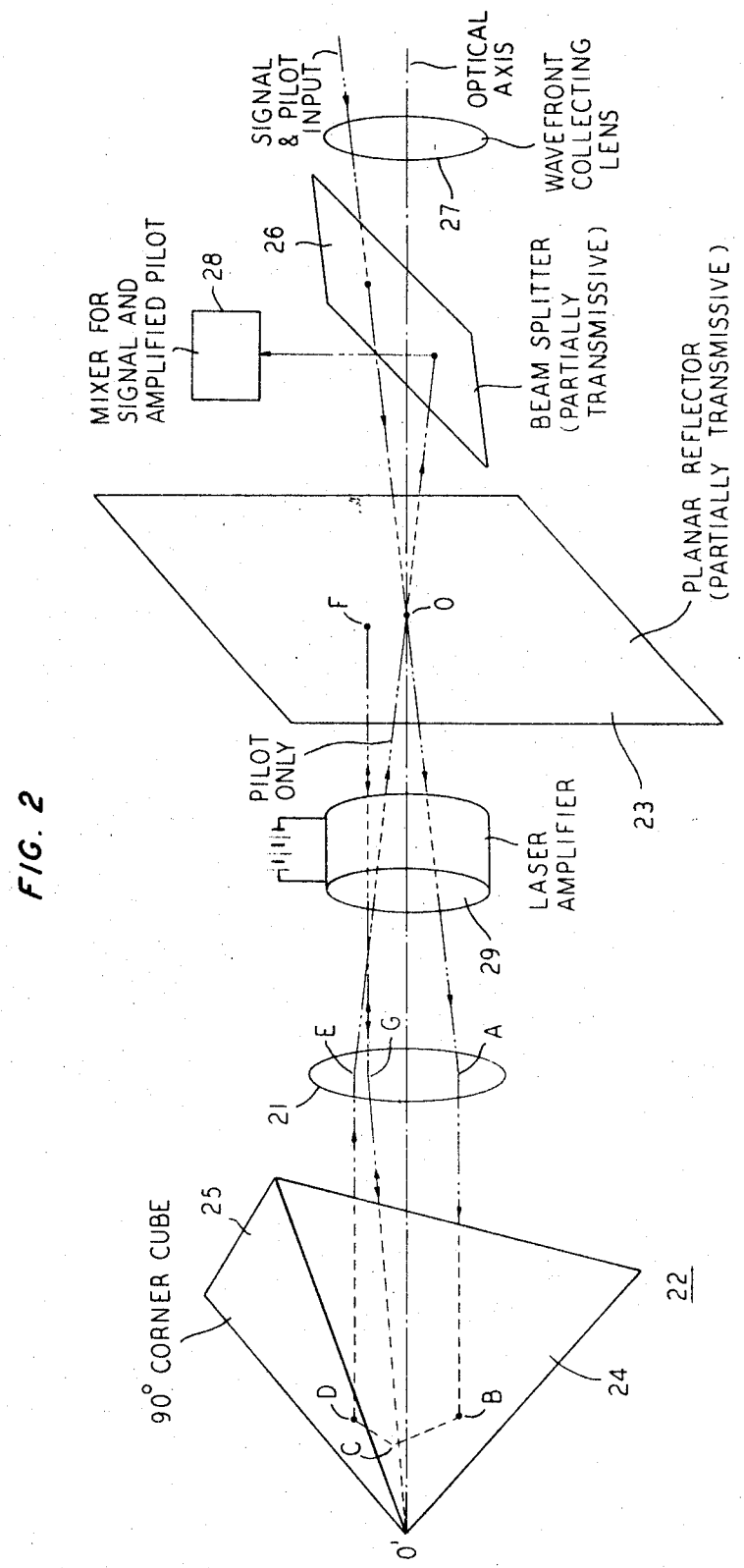
FIG. 2 is a partially pictorial and partially block diagrammatic illustration of a laser amplifier with degenerate optical resonator, as applied in a laser communication receiver.

In the illustrative embodiment of FIG. 2, lens 21 is disposed with respect to end reflectors 22 and 23 at substantially the same spacings, relative to its focal length (both spacings equal to the focal length) as was lens 11 in the embodiment of FIG. 1. The spacing of lens 21 from corner cube reflector 22 is measured to the vertex of reflector 22.

Corner cube reflector 22, in which all three surfaces are mutually perpendicular, and planar reflector 23 are illustratively conductive. Nevertheless, reflector 22 could use internal reflection in a purely refractive prism, since conductive surfaces are needed only for polarization degeneracy, which is not a problem in FIG. 2. Conductive reflective surface 23 is partially transmissive to admit a beam of light.

Illustratively, the embodiment of FIG. 2 is part of an optical communication receiver. The admitted beam comprises received signal and pilot waves, both of which have wavefronts distorted by transmission through an extended turbulent dielectric medium. The received wavefronts are collected by a lens 27 to form the beam directed through beam splitter 26 into the resonator.

The resonated beam exiting through surface 23 is partially deflected by beam splitter 26 to a mixer 28, which mixes the signal and pilot waves. Illustratively, a laser amplifier 29 near planar reflector 23 has amplified the pilot wave while the signal is, for its major part, directly directed on to the mixer by the beam splitter 26, as disclosed in my copending patent application, Ser. No. 696,446, filed Jan. 3, 1968 and assigned to the assignee hereof. Insofar as the signal penetrates the resonator, it is not resonated; whereas the pilot is resonated.

The overall system shown in FIG. 2 may be called a locally-amplified-pilot optical heterodyne receiver. I have found that amplifiers with degenerate resonators are quite useful in such systems because of the large number of received modes which contribute signal power. Sometimes the modes number is in the thousands because of transmission distortion.

For the cavity of FIGURE 2 we have to recall that a corner cube reflects *any* ray in a direction just opposite to the incident direction. Accordingly, it is clear that the ray entrant through reflector 23 at O, the focal point of lens 21, becomes the ray AB parallel to the optical axis, returns from corner cube 22 on the parallel path DE and then goes back along EO, where the resonated portion is reflected to propagate along OA again. It is not possible to visualize what exactly happens right at the corner cube top but we may think of a small displacement off the top, in the general case. For any such path, the same principles apply. The round trip path collapses to a broken line with its portion between lens 21 and reflector 23 parallel to the axis for rays focused to the corner of reflector 22. Such a path FGO'GF is clearly re-entrant; and the resonator is fully degenerate.

Moreover, the arrangement of FIG. 2 is well adapted for amplifying a received pilot beam and providing essentially unity gain for a signal carrier beam received with the plot beam in that reflector 23 is made partially transmissive for the pilot beam. All pilot transverse modes are substantially uniformly amplified in the fully degenerate regenerative amplifier formed by the resonator and by laser 29; and the signal carrier beam is reflected from reflector 23, then 50% reflected from beam splitter 26 into mixer-detector 28.

The extracted amplified pilot beam is also 50% reflected from beam splitter 26 into mixer-detector 28, where a heterodyning action occurs.

Figure 3:
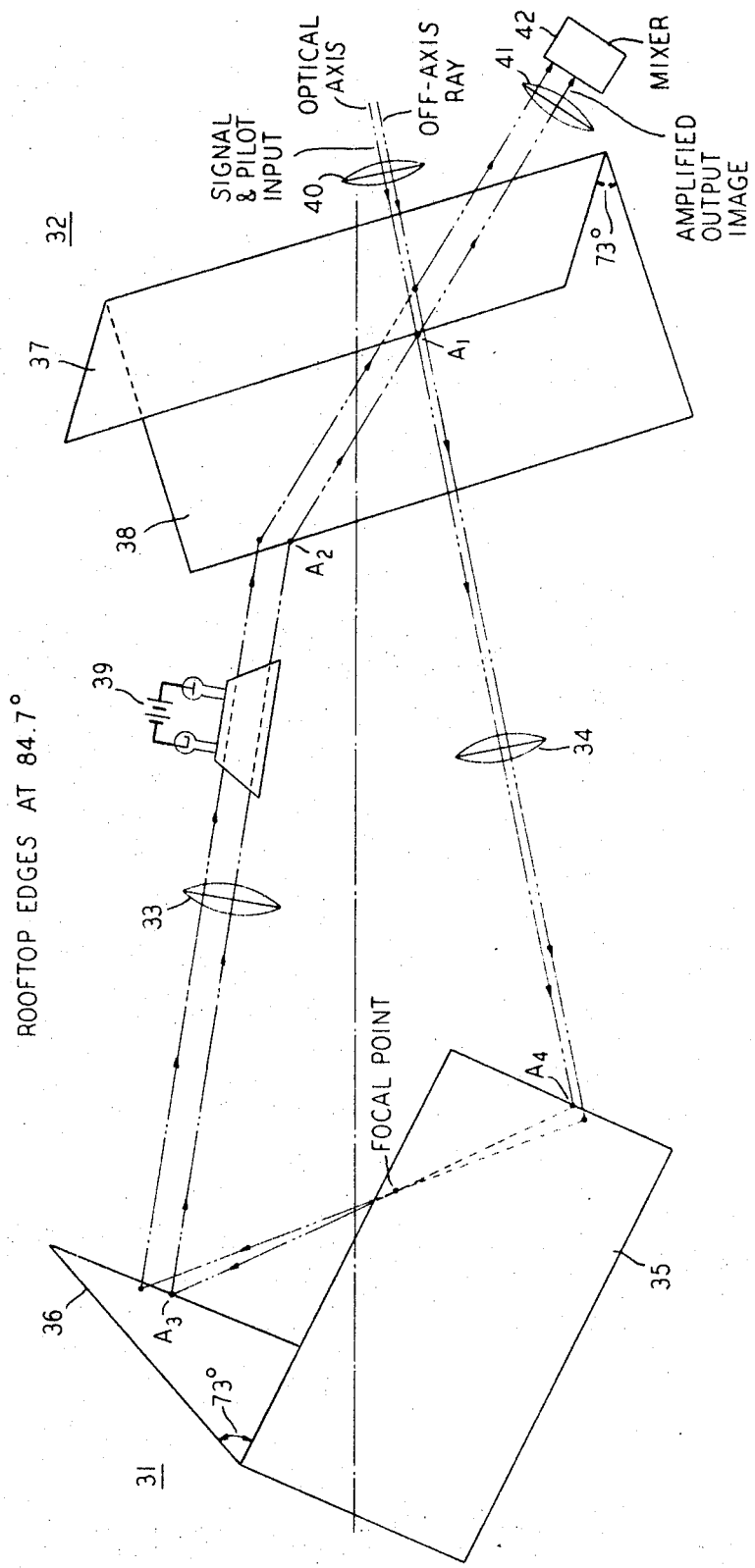
FIG. 3 is a partially pictorial and partially block diagrammatic illustration of a degenerate ring laser amplifier.

In the embodiment of FIG. 3, a three-dimensional ring-type path is established in the optical resonator. Such a ring-type path is useful, not only in image amplification (in which a great number of modes must be amplified) but also in amplifiers for communication purposes. A ring geometry permits unidirectional, traveling-wave operation and a resulting more efficient utilization of the active medium, such as the active medium of laser 39; and less optical noise results.

The degenerate ring laser geometry is established by separate but identical confocal lenses 33 and 34. Since they are confocal, they are separated by the sum of their focal lengths in either direction around the ring. It should be noted that their common focal points need not fall on the center line of reflectors 31 and 32.

The remainder of the ring resonator is formed by 73° rooftop reflectors 31 and 32. The rooftop edges make an angle of 84.7°.

It should be noted that the degenerate ring resonator of FIG. 3 requires only two focusing elements. In a manner basically analogous to that of FIG. 1, the desired inversion of rays occurs at the planar reflecting surfaces 35, 36, 37 and 38.

The operation of all the embodiments of FIGS. 1, 2 and 3 may be understood from a mathematical viewpoint as follows.

With an even number of plane mirrors as in the disclosed embodiments, the following analysis applies.

Let us call the four planar reflective surfaces of any one of the embodiments $P_1$, $P_2$, $P_3$ and $P_4$, call $\theta_1$ and $\theta_3$ the angles between, first, $P_1$ and $P_2$ and, second, $P_3$ and $P_4$, respectively. Call $\nu$ the angle between the intersection lines formed by $P_1$ and $P_2$, for one line, and $P_3$ and $P_4$, for the other line. One can image the respective reflector planes extended to interaction. Take the distance between these intersection lines as unity (by "distance" we mean the minimum distance between two points taken on each of two lines).

The round trip rotation $\Omega$ relative to the four planes above is given by $$\cos \frac{\Omega}{2} = \cos \theta_1 \cos \theta_3 - \cos \nu \sin \theta_1 \sin \theta_3 \quad (1)$$

The rotation (the beam twisting) is equal to $\pi$ when $$\cos \nu = \cot \theta_1 \cot \theta_3 \quad (2)$$

and the resonator axis path length L is then given by $$L^2 = -4\cos(\theta_1+\theta_3)\cos(\theta_1-\theta_3) \quad (3)$$

For FIG. 1, $\theta_1=\theta_3=\nu=\pi/2$ and $\Omega=\pi$ and $L=2$. Lens 11 may be called "self-confocal," and also provides a rotation equal to $\pi$ so that the total rotation is equal to zero. The resonator is consequently degenerate.

For FIGS. 1 and 2, taking the four reflective surfaces in pairs the back surface of the corner cube exists, but is not visible in the drawing), we obtain $\theta_1=\nu\pi/2$, so that $\Omega=\pi$. This conclusion can be reached for FIG. 2 readily by noting that a corner cube provides an inversion $$(\vec{r} \rightarrow -\vec{r})$$

with respect to its top and by combining the inversion with the symmetry with respect to the auxiliary plane mirror.

For FIG. 3, let us consider a twisted polygonal path $A_1A_2A_3A_4$, where $A_1$, $A_2$, $A_3$, $A_4$ have respectively the following Cartesian coordinates $(1, -\tan\alpha, -1)$, $(-1, \tan\alpha, -1)$, $(-1, -\tan\alpha, 1)$, $(1, \tan\alpha, 1)$.

When $$\tan\alpha = \left(\frac{\sqrt{2}-1}{2}\right)^{1/2}$$

or $\alpha=24°$ 30 min., the angles between adjacent incidence planes are found to be equal to $$\cos^{-1}[1/(1+2\tan^2\alpha)] = \pm\pi/4$$

the plus and minus signs being alternately applicable.

Here, $$\Omega = \beta_{12} - \beta_{23} + \beta_{34} - \beta_{41} \quad (4)$$

where the $\beta$'s represent the successive angles between adjacent incidence planes.

As a result, $\Omega=\pi$, as desired.

While more complicated structures can be devised from the disclosed embodiments, the basic principles are stated in the foregoing analysis.

I claim:

1. An optical resonator of the type in which a plurality of reflectors and at least one focusing element are adapted for substantial degeneracy, whereby a substantially arbitrary ray within said resonator retraces its own path after a single round trip within said resonator, said resonator being characterized in that a plurality of said reflectors are planar reflectors mutually oriented to produce a net rotation of a group of rays about a propagation direction by an amount equal to $n\pi$, in radians, where $n$ is an odd integer.

2. An optical resonator according to claim 1 in which the plurality of planar reflectors include two rooftop reflectors having respective internal angles $\theta_1$ and $\theta_3$ satisfying $$\cot\theta_1 \cot\theta_3 = \cos\nu$$

where $\nu$ is the angle between the respective rooftop edges of said rooftop reflectors.

3. An optical resonator according to claim 2 in which the focusing element is a lens centrally disposed within said resonator, the rooftop reflectors having included angles equal to 90 degrees and the separation of the rooftop edges is equal to twice the lens focal length.

4. An optical resonator according to claim 2 including a plurality of focusing elements disposed within said resonator to form a ring-type path therein and in which the rooftop reflectors have included angles equal to 73 degrees and the angle between the edges is 84.7 degrees.

5. An optical resonator according to claim 4 in which the focusing elements are confocally disposed lenses.

6. An optical resonator according to claim 1 in which three of the plurality of planar reflectors form a corner cube reflector.

7. An optical resonator according to claim 6 including an additional planar reflector disposed in opposition to the corner cube reflector and in which the focusing element is a lens centrally disposed within said resonator, the distance between the corner cube top and the plane reflector being equal to twice the lens focal length.

8. An optical resonator according to claim 1 adapted to be a resonator for a laser amplifier in that a laser active medium is disposed within said resonator in a region common to a plurality of ray paths, and means for pumping the laser active medium is associated with said medium.

References Cited

Pole: "Journal of the Optical Society of America," March 1965, pp. 254–260.

Hardy: "IBM Journal of Research and Development," January 1965, pp. 31–46.

ROY LAKE, Primary Examiner

D. R. HOSTETTER, Assistant Examiner

U.S. Cl. X.R.

250—199, 213; 330—56; 331—94; 333—83